United States Patent
Ishii et al.

(10) Patent No.: US 10,781,329 B2
(45) Date of Patent: Sep. 22, 2020

(54) AQUEOUS INK, INK CARTRIDGE AND INK JET RECORDING METHOD

(71) Applicant: CANON KABUSHIKI KAISHA, Tokyo (JP)

(72) Inventors: Tomoaki Ishii, Saitama (JP); Kenji Moribe, Fujisawa (JP); Masayuki Ikegami, Atsugi (JP); Masashi Yamamoto, Tokyo (JP); Yoko Taira, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/380,850

(22) Filed: Apr. 10, 2019

(65) Prior Publication Data

US 2019/0315985 A1 Oct. 17, 2019

(30) Foreign Application Priority Data

Apr. 13, 2018 (JP) .................................. 2018-077807
Mar. 19, 2019 (JP) .................................. 2019-051934

(51) Int. Cl.
*C09D 11/38* (2014.01)
*C09D 11/322* (2014.01)
*B41M 5/00* (2006.01)
*C09D 11/033* (2014.01)
*C09D 11/037* (2014.01)

(52) U.S. Cl.
CPC ........... *C09D 11/38* (2013.01); *B41M 5/0023* (2013.01); *C09D 11/033* (2013.01); *C09D 11/037* (2013.01); *C09D 11/322* (2013.01)

(58) Field of Classification Search
CPC ..... C09D 11/38; C09D 11/322; C09D 11/033; C09D 11/037; B41M 5/0023
See application file for complete search history.

(56) References Cited

FOREIGN PATENT DOCUMENTS

| JP | 2004-285106 A | 10/2004 |
| JP | 2010-507727 A | 3/2010 |
| JP | 2011-140635 A | 7/2011 |
| JP | 2011-241242 A | 12/2011 |
| JP | 2013-064053 A | 4/2013 |

OTHER PUBLICATIONS

IP.com search (Year: 2020).*
Machine Translation of JP2011241242 A, Hirata, Shiki et al., Dec. 1, 2011, Paragraphs 0010, 0015, 0018-0019, 0037-0041 (Year: 2011).*

* cited by examiner

*Primary Examiner* — Lisa Solomon
(74) *Attorney, Agent, or Firm* — Canon U.S.A., Inc. IP Division (57) ABSTRACT

An aqueous ink containing silver particles, a first reducing agent and a second reducing agent, wherein the first reducing agent is a compound that has an oxidation-reduction potential $R_1$ (mV) satisfying $R_1<0$, and the second reducing agent is a compound that has an oxidation-reduction potential $R_2$ (mV) satisfying $R_2 \geq 0$ and that is at least one selected from a group consisting of tertiary amines and polyhydric alcohols in which a plurality of hydroxy groups are included in one of two structures divided according to a position between any one of two adjacent carbon atoms of the longest carbon chain in the molecule.

11 Claims, 2 Drawing Sheets

AQUEOUS INK, INK CARTRIDGE AND INK JET RECORDING METHOD

BACKGROUND OF THE INVENTION

Field of the Invention

The present disclosure relates to an aqueous ink, an ink cartridge and an ink jet recording method.

Description of the Related Art

Ink containing metal particles has been used to form an electric circuit by exploiting the electrical conductivity of the metal particles and, in recent years, has also been applied to, for example, Christmas greeting cards having a metallic appearance. In such usage, it is desirable to record an image having a metallic appearance (hereafter also referred to as a "metallic image") in order to enhance decorativeness of an image. For the purpose of recording a metallic image, an ink containing an aluminum pigment has been proposed (refer to Japanese Patent Laid-Open No. 2013-064053). In addition, an aqueous ink containing silver particles has been proposed (refer to Japanese Patent Laid-Open No. 2011-241242 and Japanese Patent Laid-Open No. 2011-140635).

The present inventors performed research on an ink containing metal particles as a coloring material in the related art. As a result, it was found that silver particles had to be used as the coloring material for the purpose of having the glossy appearance required of the metallic image. That is, it was found that the glossiness of an image recorded by using an aqueous ink in which the coloring material was aluminum, as described in Japanese Patent Laid-Open No. 2013-064053, was poor compared with the case of silver particles.

Meanwhile, according to an ink in which the silver particles are used as a coloring material, as described in Japanese Patent Laid-Open No. 2011-241242 or Japanese Patent Laid-Open No. 2011-140635, a metallic image having favorable glossiness may be recorded. However, it was found that the original glossiness just after recording (initial glossiness) degraded gradually when the recorded image was stored.

SUMMARY OF THE INVENTION

Accordingly, the present disclosure provides an aqueous ink with which an image having excellent glossiness not only just after recording but also after storage is recorded, an ink cartridge using the aqueous ink and an ink jet recording method.

An aqueous ink according to the present disclosure contains silver particles, a first reducing agent and a second reducing agent, wherein the first reducing agent is a compound that has an oxidation-reduction potential $R_1$ (mV) satisfying $R_1 < 0$, and the second reducing agent is a compound that has an oxidation-reduction potential $R_2$ (mV) satisfying $R_2 \geq 0$ and that is at least one selected from a group consisting of tertiary amines and polyhydric alcohols in which a plurality of hydroxy groups are included in one of two structures divided according to a position between any one of two adjacent carbon atoms of the longest carbon chain in the molecule.

Further features of the present disclosure will become apparent from the following description of exemplary embodiments with reference to the attached drawings.

BRIEF DESCRIPTION OF THE DRAWINGS

FIGS. 2A and 2B are schematic diagrams showing an example of an ink jet recording apparatus used in an ink jet recording method according to the present disclosure.

DESCRIPTION OF THE EMBODIMENTS

The present disclosure will be described below in further detail with reference to the embodiment. In the case in which a compound is a salt, the salt dissociates and is present as ions in an ink, and this state is expressed as "an ink contains a salt" for the sake of convenience in the present disclosure. In addition, an aqueous ink may be simply referred to as an "ink". Physical property values are values at normal temperature (25° C.) unless otherwise specified.

An image having favorable glossiness (initial) is recorded by using an aqueous ink containing silver particles rather than aluminum as a coloring material. However, as a result of research by the present inventors, it was found that glossiness of the image recorded by using the aqueous ink containing silver particles degraded after prolonged storage in some cases. According to analysis of the image having favorable glossiness just after recording and the image having degraded glossiness due to storage, crystals of silver chloride were generated in a silver layer constituting the image, and crystals in the state of still being grown were present in the image after storage. It is supposed that generation and crystal growth of silver chloride may occur as described below.

In general, a chloride ion ($Cl^-$) is contained in a recording medium used to record an image. A recording medium, for example, plain paper, that includes no ink-receiving layer contains a chloride ion derived from a bleaching agent of pulp. On the other hand, a recording medium that includes an ink-receiving layer contains a cationic compound, for example, a resin in which a counter ion is a chloride ion. When an aqueous ink containing silver particles is applied to such a recording medium, hydrogen atoms constituting water molecules in the ink are polarized into $\delta^+$ so as to attract the chloride ion, and the chloride ion bleeds to the vicinity of the surface of the recording medium through the water. The chloride ion reacts with silver attaching to the recording medium so as to generate silver chloride. Since silver chloride is hardly soluble in water, crystals are formed. Thereafter, water molecules are continuously supplied due to absorption of moisture by the recording medium during storage of the image. Consequently, the same reaction as that described above occurs and crystals of silver chloride grow. Therefore, it is supposed that glossiness degrades due to storage of the image.

In the process in which silver reacts with the chloride ion so as to generate silver chloride, silver atoms are oxidized. Then, the present inventors added a first reducing agent into an ink containing silver particles. Even when the ink is applied to a recording medium and silver chloride is generated, silver chloride is reduced to silver by the first reducing agent and, as a result, glossiness (initial) of an image is improved. Regarding the first reducing agent, a compound that has an oxidation-reduction potential $R_1$ (mV) satisfying $R_1 < 0$ is used.

The oxidation-reduction potential (mV) of a substance is measured by placing a reference electrode (platinum electrode) and a comparison electrode in a solution containing the substance. The oxidation-reduction potential (mV) is an indicator showing the degree of ease of movement of electrons to an electrode. A smaller value of the oxidation-reduction potential (mV) indicates that electrons readily move to the electrode and that a measurement target substance has a large reducing force. In the present disclosure, a silver-silver chloride electrode is used as the comparison electrode. On the surface of the silver-silver chloride electrode, a reversible oxidation-reduction reaction, $Ag+Cl^- \leftrightarrow AgCl+e^-$, occurs. A compound that has a low oxidation-reduction potential $R_1$ (mV) measured by using the silver-silver chloride electrode, in particular a compound that satisfies $R_1<0$, readily releases electrons. The released electrons move to the electrode and may cause a reaction, $AgCl+e^- \rightarrow Ag+Cl^-$.

That is, the reaction of reducing silver chloride to silver efficiently occurs as a result of using the compound that has an oxidation-reduction potential $R_1$ (mV) satisfying $R_1<0$ as the first reducing agent. Consequently, glossiness (initial) of an image is improved.

In this regard, when the first reducing agent reduced silver chloride, the first reducing agent was oxidized. It was found that the thus generated oxide of the first reducing agent attached to crystals of silver chloride which had not yet been reduced, and the oxide resulted in steric hindrance so as to hinder an occurrence of reduction thereafter. That is, degradation in glossiness during storage of the image is not suppressed by only the first reducing agent.

The present inventors added a second reducing agent in addition to the first reducing agent into an ink containing silver particles. For the first reducing agent to continuously exert an effect on the second reducing agent reducing the oxide of the first reducing agent that attaches to the crystals of silver chloride, the following two conditions have to be satisfied. That is, it is necessary that the second reducing agent have a smaller reducing force than the first reducing agent and, in addition, the second reducing agent be present while maintaining an appropriate distance from the crystals of silver chloride. Regarding the second reducing agent that satisfies such conditions, a specific compound that has an oxidation-reduction potential $R_2$ (mV) satisfying $R_2 \geq 0$ is used. The oxidation-reduction potential of the second reducing agent and the type of the compound will be described below.

Regarding the second reducing agent, a compound having a smaller reducing force than the first reducing agent, that is, a compound having an oxidation-reduction potential $R_2$ (mV) satisfying $R_2 \geq 0$, is used. In the case in which the compound having an oxidation-reduction potential $R_2$ (mV) satisfying $R_2 \geq 0$ is used in combination with the first reducing agent, the first reducing agent having a larger reducing force preferentially acts on silver chloride. Consequently, the second reducing agent does not directly act on silver chloride but is preferentially exploited for a reaction in which the oxide of the first reducing agent is reduced.

The above-described reducing force relationship has to be satisfied and, in addition, the second reducing agent has to be present while maintaining an appropriate distance from the crystal of silver chloride. This is because in the case in which the distance between the second reducing agent and the crystals of silver chloride is too small, the first reducing agent is suppressed from approaching and acting on silver chloride and in the case in which the distance between the second reducing agent and the crystals of silver chloride is excessively large, it becomes difficult to reduce the oxide of the first reducing agent that attaches to the crystals of silver chloride. From this viewpoint, a specific compound has to be used as the second reducing agent. This specific compound is at least one selected from a group consisting of (1) tertiary amines and (2) polyhydric alcohols in which a plurality of hydroxy groups are included in one of two structures divided according to a position between any one of two adjacent carbon atoms of the longest carbon chain in the molecule. Each compound will be described below.

(1) Tertiary Amines

As is understood from the fact that organic amines are general-purpose protective agents for silver particles, organic amines have characteristics that enable silver to be readily adsorbed, and these characteristics are affected by steric hindrance. Tertiary amines have high affinity with silver particles but are present while maintaining a certain distance from the crystals of silver chloride because of exerting larger steric hindrance than primary and secondary amines Therefore, the first reducing agent is caused to readily approach the crystals of silver chloride, the oxide of the first reducing agent that attaches to the crystals of silver chloride is efficiently reduced, and degradation in glossiness after storage of the image is suppressed. On the other hand, primary and secondary amines have low steric hindrance and readily approach silver so as to preferentially attach to the crystals of silver chloride. Consequently, the above-described operation of the first reducing agent does not readily occur, and degradation in glossiness after storage of the image is not suppressed.

(2) Specific Polyhydric Alcohols

Hydroxy groups of alcohols exhibit orientation toward silver but the affinity is low compared with amines Therefore, in consideration of the steric arrangement of atoms, it is necessary that, of alcohols, a compound having a structure in which two or more hydroxy groups exhibit orientation toward silver be used. Regarding the condition for this, it is necessary to use polyhydric alcohols in which a plurality of hydroxy groups are included in one of two structures divided according to a position between any one of two adjacent carbon atoms of the longest carbon chain in the molecule. Even when compounds that do not satisfy the condition, for example, compounds having a hydroxy group at both terminals of a straight hydrocarbon chain (ethylene glycol or 1,6-hexanediol) or monohydric alcohols are used, it is not possible to suppress degradation of glossiness after storage of the image. The reason for this is supposed that in consideration of the steric arrangement of atoms, only one hydroxy group effectively exhibits orientation toward silver, but the orientation toward silver is insufficient, and, as a result, it is not possible for the compound to be present while maintaining an appropriate distance from the crystals of silver chloride. Consequently, the oxide of the first reducing agent is not reduced and degradation in glossiness after storage of the image is not suppressed.

Aqueous Ink

The ink according to the present disclosure is an aqueous ink that contains silver particles, a first reducing agent and a second reducing agent. The aqueous ink may be suitable for ink jet use. The ink according to the present disclosure is not necessarily what is called "curable ink". Thus, the ink does not necessarily contain a compound that is polymerizable by application of external energy, such as a polymerizable monomer. The components constituting the aqueous ink will be described below. In this regard, the content of each component is expressed in units of mmol/g, which is the number of millimoles of component per gram of ink.

Silver Particles

Silver particles are composed of silver atoms. The silver particles may be formed to contain other metal atoms, oxygen atoms, sulfur atoms, carbon atoms and the like. However, the proportion (%) of silver atoms in the silver particles is preferably 50.0% by mass or more. The particle diameter at a cumulative volume of 50% of the silver particles, which is measured by a dynamic light scattering method, is preferably 10 nm or more to 150 nm or less.

The content (% by mass) of silver particles in the aqueous ink is preferably 2.0% by mass or more to 15.0% by mass or less and further preferably 2.0% by mass or more to 8.0% by mass or less with reference to the total mass of the ink. If the content is less than 2.0% by mass, silver particles are excessively low in quantity and glossiness (initial) of the image may become insufficient. If the content is more than 15.0% by mass, ejection stability may somewhat degrade in application to an ejection system that exploits thermal energy. This is because thermal energy applied to the ink is increased by silver particles attaching to a heater of a recording head and bubble generation is not readily stabilized. The content (mmol/g) of silver particles in the aqueous ink is preferably 15.0 mmol/g or more to 150.0 mmol/g or less and further preferably 15.0 mmol/g or more to 80.0 mmol/g or less.

Examples of the method for manufacturing silver particles include a method in which a lump of silver is pulverized by a grinder such as a ball mill and a jet mill (pulverization method) and a method in which silver ions or silver complexes are reduced by a general-purpose reducing agent so as to cause aggregation (reducing method). In the present disclosure, silver particles produced by using the reducing method can be used from the viewpoint of ease of controlling the particle diameter of silver particles and dispersion stability of silver particles.

Silver particles dispersed by using a dispersant, for example, a surfactant or a resin, can be used. The content (% by mass) of the dispersant in the aqueous ink is preferably 0.1% by mass or more to 5.0% by mass or less with reference to the total mass of the ink.

In addition, a mass ratio of the content (% by mass) of the dispersant in the aqueous ink to the content (% by mass) of the silver particles is preferably 0.2 times or more to 1.5 times or less. If the mass ratio is less than 0.2 times, the dispersant is excessively sparse relative to the silver particles. As a result, silver particles attaching to a recording medium are not sufficiently covered by the dispersant, and exposure of the surfaces of the silver particles tends to increase. Consequently, silver readily reacts with the chloride ion and silver chloride is readily generated, and it is possible that degradation in glossiness after storage of the image is not sufficiently suppressed. If the mass ratio is more than 1.5 times, the dispersant is excessive relative to silver particles. As a result, silver particles attaching to a recording medium are excessively covered by the dispersant, and exposure of the surfaces of the silver particles tends to decrease. Consequently, silver particles do not easily aggregate after the ink is applied to the recording medium, and it is possible that glossiness (initial) of the image is not sufficiently obtained.

Regarding the dispersant of the silver particles, various surfactants, for example, an anionic surfactant, a nonionic surfactant, a cationic surfactant and an amphoteric surfactant, may be used. Examples of the anionic surfactant include fatty acid salts, alkyl sulfates, alkyl aryl sulfonates, alkyl diaryl ether disulfonates, dialkyl sulfosuccinates, alkyl phosphates, naphthalene sulfonic acid formalin condensates, polyoxyethylene alkyl ether sulfates, polyoxyethylene alkyl phosphoric acid ester salts and glycerol borate fatty acid esters. Examples of the nonionic surfactant include polyoxyethylene alkyl ethers, polyoxyethylene oxypropylene block copolymers, sorbitan fatty acid esters, glycerin fatty acid esters, polyoxyethylene fatty acid esters, polyoxyethylene alkylamines, fluorine-based compounds and silicone-based compounds. Examples of the cationic surfactant include alkylamine salts, quaternary ammonium salts, alkylpyridinium salts and alkylimidazolium salts. Examples of the amphoteric surfactant include alkylamine oxides and phosphatidylcholine. In particular, at least one surfactant selected from a group consisting of the anionic surfactants and the nonionic surfactants can be used as the dispersant. Regarding the anionic surfactant, a polyoxyethylene alkyl ether sulfate can be used. Regarding the nonionic surfactant, a polyoxyethylene alkyl ether can be used.

Regarding the dispersant of the silver particles, a resin that includes a unit having an anionic group and a unit having no anionic group may be used. Examples of the skeleton of the resin include vinyl-based resins, ester-based resins, amino-based resins, acrylic resins, urethane-based resins, ether-based resins, amide-based resins, phenol-based resins, silicone-based resins and fluorine-based resins.

Reducing Agent

The ink contains the first reducing agent and the second reducing agent. The first reducing agent is a compound that has an oxidation-reduction potential $R_1$ (mV) satisfying $R_1<0$. The second reducing agent is a compound that has an oxidation-reduction potential $R_2$ (mV) satisfying $R_2 \geq 0$ and that is at least one selected from a group consisting of tertiary amines and polyhydric alcohols. The reducing agent is a substance that has a function of reducing other substances and is oxidized by releasing electrons.

The oxidation-reduction potential (mV) of each reducing agent is measured under a condition of pH 9 by using a silver-silver chloride electrode. This electrode is selected because of a simple measurement procedure and high accuracy of a measurement value regardless of the coloring material of the ink being silver. The oxidation-reduction potential depends on pH. In the present disclosure, the oxidation-reduction potential (mV) value at pH 9 is used because the pH is close to the pH of a common aqueous ink and the measurement value is stable.

Specifically, a measurement target substance is dissolved into a borate standard solution serving as a pH standard solution such that the content becomes 0.1% by mass, the pH of the liquid is adjusted to 9, as the situation demands, and the oxidation-reduction potential is measured. In the case in which the pH of the liquid is less than 9, it is possible to increase the pH by using a base (aqueous solution may be adopted), for example, potassium hydroxide, and in the case in which the pH of the liquid is more than 9, it is possible to decrease the pH by using an acid, for example, sulfuric acid.

First Reducing Agent

The first reducing agent is a compound that has an oxidation-reduction potential $R_1$ (mV) of less than zero, that is, $R_1<0$. There is no particular limitation regarding the first reducing agent as long as the above-described definition is satisfied, and examples include saccharides having a lactone structure, phenols and pyrazolidones. These first reducing agents are capable of efficiently reducing silver chloride to silver.

Examples of saccharides having a lactone structure include ascorbic acid. Examples of phenols include N-methyl-p-aminophenol sulfate (trade name "Metol") and hydroquinone. Examples of pyrazolidones include 1-phenyl-3-pyrazolidone (trade name "Phenidone"), 1-phenyl-4-methyl-3-pyrazolidone, 1-phenyl-4-ethyl-3-pyrazolidone and 1-phenyl-4,4-dimethyl-3-pyrazolidone. An acid group in a compound, for example, ascorbic acid, may be in the form of a salt. A cation constituting the salt can be an alkali metal ion of, for example, lithium, sodium or potassium.

Most of all, the first reducing agent can be a saccharide having a lactone structure and, in particular, ascorbic acid. Of the first reducing agents, an oxide of ascorbic acid is readily reduced by the second reducing agent, and the operation of the first reducing agent is readily restored. Therefore, ascorbic acid is capable of continuously and efficiently reducing silver chloride. Consequently, degradation in glossiness after storage of the image is more effectively suppressed.

The content (mmol/g) of the first reducing agent in the aqueous ink is preferably 0.1 mmol/g or more to 50.0 mmol/g or less and further preferably 1.0 mmol/g or more to 30.0 mmol/g or less. In addition, a molar ratio of the content (mmol/g) of the first reducing agent in the aqueous ink to the content (mmol/g) of the silver particles is preferably 0.1 times or more. If the molar ratio is less than 0.1 times, the first reducing agent is sparse relative to the silver particles. As a result, glossiness (initial) of the image may degrade, and it is possible that degradation in glossiness after storage of the image is not sufficiently suppressed. The molar ratio is preferably 0.9 times or less.

Second Reducing Agent

The second reducing agent has an oxidation-reduction potential $R_2$ (mV) that is higher than the oxidation-reduction potential of the first reducing agent and that satisfies $R_2 \geq 0$ and is one selected from a group consisting of tertiary amines and specific polyhydric alcohols. The polyhydric alcohols are compounds in which a plurality of hydroxy groups are included in one of two structures divided according to a position between any one of two adjacent carbon atoms of the longest carbon chain in the molecule.

Examples of tertiary amines include trialkanolamines, for example, triethanolamine and tripropanol amine; and trialkylamines, for example, triethylamine, tributylamine and trihexylamine. In particular, alkanolamines can be adopted. The alkanolamines have characteristics to readily adsorb silver and, in addition, have orientation toward silver due to a hydroxy group present in the molecular structure. Therefore, the alkanolamines are capable of being present at a position particularly suitable for efficiently reducing the oxide of the first reducing agent and, as a result, capable of more effectively suppressing degradation in glossiness after storage of the image. Of the alkanolamines, in particular, triethanolamine can be adopted.

The polyhydric alcohols are compounds in which a plurality of hydroxy groups are included in one of two structures divided according to a position between any one of two adjacent carbon atoms of the longest carbon chain in the molecule. "The longest carbon chain in the molecule" conforms to the definition in IUPAC nomenclature that defines a chain containing the largest number of constituent carbon atoms as a "main chain". The polyhydric alcohols that satisfy the definition in the present disclosure have a structure in which two or more hydroxy groups act on orientation toward silver in consideration of a steric arrangement of atoms.

Examples of polyhydric alcohols include dihydric alcohols having a carbon atom number of 3 or more to 7 or less, for example, 1,2-propanediol, 1,2-butanediol, 2,3-butanediol, 1,3-butanediol, 1,4-butanediol, 1,2-pentanediol, 1,2-hexanediol, 1,2,6-hexanetriol and 1,2-heptanediol; polyhydric alcohols, for example, glycerin and trimethylolpropane; and sugar alcohols, for example, xylitol, D-glucose and sorbitol. Most of all, sugar alcohols can be adopted and, in particular, sugar alcohols having three or more hydroxy groups can be adopted. These sugar alcohols are capable of orienting toward silver due to a plurality of hydroxy groups that are present at sterically suitable positions. Therefore, these sugar alcohols are capable of more effectively suppressing degradation in glossiness after storage of the image because of being present at positions particularly suitable for efficiently reducing the oxide of the first reducing agent. Of the sugar alcohols, in particular, sorbitol can be adopted.

Regarding the second reducing agent alkanolamines can be used. Most of all, triethanolamine can be adopted.

The content (mmol/g) of the second reducing agent in the aqueous ink is preferably 0.1 mmol/g or more to 200.0 mmol/g or less and further preferably 1.0 mmol/g or more to 150.0 mmol/g or less. In addition, a molar ratio of the content (mmol/g) of the second reducing agent in the aqueous ink to the content (mmol/g) of the first reducing agent is preferably 0.1 times or more. If the molar ratio is less than 0.1 times, the second reducing agent is sparse relative to the first reducing agent. As a result, it is possible that the oxide of the first reducing agent is not readily reduced and that degradation in glossiness after storage of the image is not sufficiently suppressed. The molar ratio is preferably 20.0 times or less and further preferably 10.0 times or less.

When primary or secondary amines are included in the ink for the purpose of facilitating efficient exhibition of the operation of the second reducing agent, the content can be set at a somewhat low level. Specifically, the content (% by mass) of the primary or secondary amines in the aqueous ink is preferably 0.1% by mass or less with reference to the total mass of the ink.

Aqueous Medium

The ink is an aqueous ink containing at least water as an aqueous medium. The ink may contain water or an aqueous medium that is a mixture of water and a water-soluble organic solvent. Regarding the water, deionized water or ion-exchanged water can be used. The content (% by mass) of the water in the aqueous ink is preferably 50.0% by mass or more to 95.0% by mass or less with reference to the total mass of the ink.

There is no particular limitation regarding the water-soluble organic solvent as long as water solubility is provided, and any of monohydric alcohols, other polyhydric alcohols, (poly)alkylene glycols, glycol ethers, nitrogen-containing polar solvents and sulfur-containing polar solvents may be used. In general, "water-soluble organic solvent" refers to a liquid. However, in the present disclosure, the water-soluble organic solvent includes solvents that are solid at 25° C. The content (% by mass) of the water-soluble organic solvent in the ink is preferably 3.0% by mass or more to 50.0% by mass or less with reference to the total mass of the ink. In the case where a specific compound is used as the second reducing agent, this content includes the specific compound. Regarding application to an ink jet recording method, if the content of the water-soluble organic solvent is out of the above-described range, reliability such as sticking resistance and ejection stability may somewhat degrade.

Surfactant

The ink can further contain a surfactant different from a surfactant that is usable as a dispersant of silver particles. In the aqueous ink, the content (% by mass) of the surfactant other than a surfactant that is used as the dispersant of silver particles is preferably 0.1% by mass or more to 2.0% by mass or less with reference to the total mass of the ink.

Examples of the surfactant include anionic surfactants, nonionic surfactants, cationic surfactants and amphoteric surfactants. In particular, a nonionic surfactant, for example, an acetylene glycol ethylene oxide adduct and polyoxyethylene alkyl ether, can be adopted.

The HLB value of the nonionic surfactant determined by the Griffin method is preferably 10 or more. If the HLB value is less than 10, it is possible that a state of being dissolved in the aqueous ink is not smoothly maintained because of high hydrophobicity. The HLB value determined by the Griffin method is calculated from the formula weight of an ethylene oxide group of a surfactant and the molecular weight of the surfactant on the basis of a formula, HLB value=20×(formula weight of ethylene oxide group of surfactant)/(molecular weight of surfactant). The HLB value determined by the Griffin method is a physical property value which expresses the degree of hydrophilicity or lipophilicity in the range of 0 to 20, where a smaller HLB value indicates higher lipophilicity and a larger HLB value indicates higher hydrophilicity.

Other Additives

The ink may contain various additives, for example, a defoaming agent, a pH adjuster, a viscosity adjuster, a rust inhibitor, a preservative, a fungicide, other resins and an antioxidant, as the situation demands, in addition to the above-described components. In particular, the ink can contain an antioxidant. As described above, the ink contains the first reducing agent having a large reducing force. A compound having a large reducing force is necessarily readily oxidized. Therefore, oxidation of the first reducing agent is readily caused by even a small amount of oxygen included in the ink. Oxidation of the first reducing agent is suppressed by including the antioxidant into the ink. A general-purpose compound may be used as the antioxidant, and examples include sodium sulfite, 4-methoxyphenol, taurine, folic acid, mercaptopyridine and p-toluenesulfinic acid. In particular, sodium sulfite can be adopted. The content (% by mass) of the antioxidant in the aqueous ink is preferably 0.1% by mass or more to 2.0% by mass or less with reference to the total mass of the ink. In this regard, some general-purpose oxidants such as sodium sulfite have an oxidation-reduction potential of zero or more and have the operation of a reducing agent. However, it may be said that a so-called "antioxidant" does not exert the above-described operation of a second reducing agent because of the structure and the functional group.

Physical Properties of Ink

The viscosity (mPa·s) at 25° C. of the ink is preferably 1 mPa·s or more to 6 mPa·s or less and further preferably 1 mPa·s or more to 4 mPa·s or less. The surface tension (mN/m) at 25° C. of the ink is preferably 10 mN/m or more to 60 mN/m or less, more preferably 20 mN/m or more to 50 mN/m or less, and further preferably 25 mN/m or more to 40 mN/m or less. The surface tension of the ink is adjusted by the type and the content of the surfactant. The pH at 25° C. of the ink is preferably 7 or more to 10 or less, and in this range, the operation of each reducing agent is efficiently exerted.

Ink Cartridge

Figure 1:
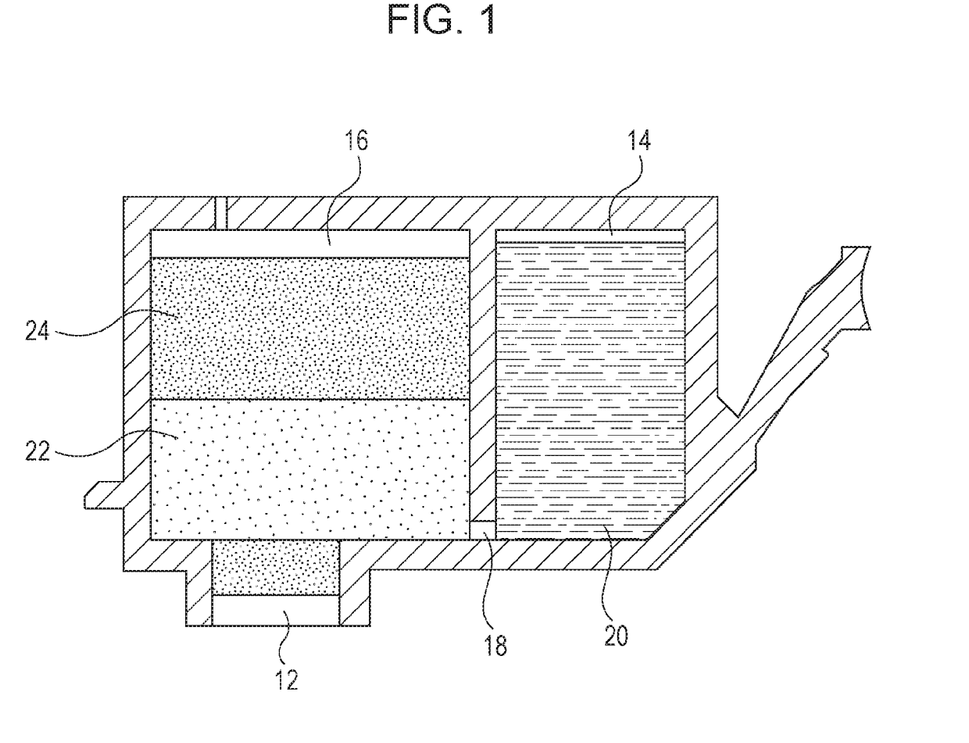
FIG. 1 is a schematic sectional view showing an embodiment of an ink cartridge according to the present disclosure.

The ink cartridge according to the present disclosure includes an ink and an ink storage portion for storing the ink. The ink stored in the ink storage portion is the above-described ink according to the present disclosure. FIG. 1 is a schematic sectional view showing an embodiment of the ink cartridge according to the present disclosure. As shown in FIG. 1, an ink supply port 12 for supplying the ink to a recording head is disposed in the bottom of the ink cartridge. The inside of the ink cartridge is the ink storage portion for storing the ink. The ink storage portion is composed of an ink storage chamber 14 and an absorber holder 16, and these communicate with each other through a communication port 18. The absorber holder 16 communicates with the ink supply port 12. The ink containing chamber 14 contains the ink 20, and the absorber holder 16 contains absorbers 22 and 24 that hold the ink in an immersed state. It is possible that the ink storage portion includes no ink containing chamber configured to store a liquid ink and that the ink storage portion is in the form of holding the entire ink by an absorber. Alternatively, it is possible that the ink storage portion includes no absorber and that the ink storage portion is in the form of storing the entire ink in a liquid state. Further, the ink cartridge may be in the form that is configured to include an ink storage portion and a recording head.

Ink Jet Recording Method

The ink jet recording method according to the present disclosure is a method for recording an image on a recording medium by ejecting the above-described ink according to the present disclosure from an ink jet recording head. Examples of the system for ejecting the ink include a system in which mechanical energy is applied to the ink and a system in which thermal energy is applied to the ink. In the present disclosure, the recording head can eject the ink by the operation of thermal energy. The process of the ink jet recording method may be a known process except that the ink according to the present disclosure is used.

Figure 2A:
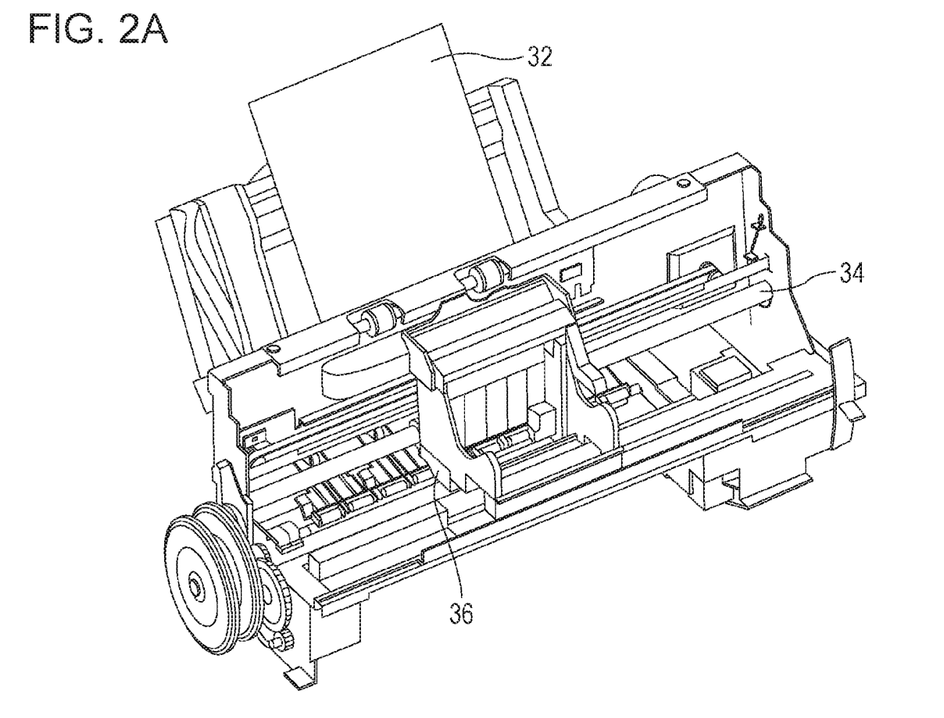
FIG. 2A is a perspective view showing a main portion of the ink jet recording apparatus.
Figure 2B:
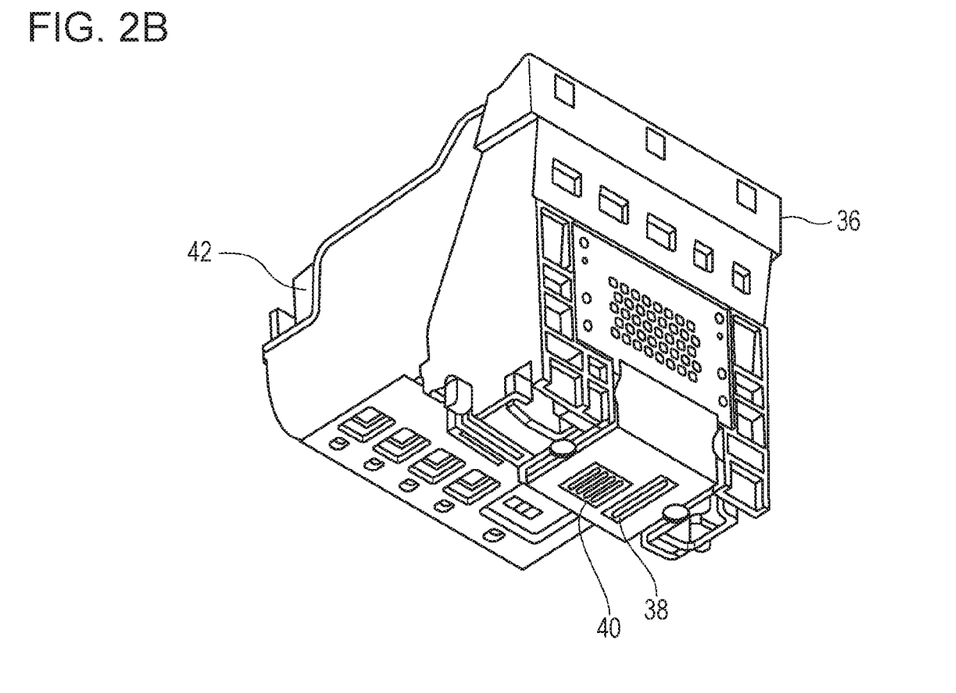
FIG. 2B is a perspective view showing a head cartridge.

FIGS. 2A and 2B are diagrams showing an example of an ink jet recording apparatus used in the ink jet recording method according to the present disclosure, FIG. 2A is a perspective view showing a key portion of the ink jet recording apparatus, and FIG. 2B is a perspective view showing a head cartridge. The ink jet recording apparatus includes a conveyance unit (not shown in the drawing) to convey a recording medium 32 and a carriage shaft 34. A head cartridge 36 is mountable on the carriage shaft 34. The head cartridge 36 includes recording heads 38 and 40 and is configured to be set with an ink cartridge 42. The ink (not shown in the drawing) is ejected from the recording heads 38 and 40 toward the recording medium 32 while the head cartridge 36 is conveyed along the carriage shaft 34 in the main scanning direction. Then, the recording medium 32 is conveyed in the sub-scanning direction by the conveyance unit (not shown in the drawing) and, as a result, an image is recorded on the recording medium 32. Any medium may be used as the recording medium that is a target of recording by using the ink according to the present disclosure, and a paper-based recording medium having permeability, for example, plain paper and a recording medium having an ink-receiving layer (glossy paper or art paper), can be used. In particular, a recording medium having an ink-receiving layer, for example, glossy paper, can be used because a recorded image has an excellent metallic appearance. The recording medium, for example, glossy paper, that is used in the ink jet recording method usually includes an ink-receiving layer containing a chloride ion. Chloride ion is contained in a cationic compound, for example, polydiallyldimethylammonium chloride or polyaluminum chloride. Problems, for example, degradation in glossiness (initial) of the image recorded by using an ink containing silver particles and degradation in glossiness after storage of the image, are caused by such a chloride ion.

EXAMPLES

The present disclosure will be described below in further detail with reference to the examples and the comparative examples, but the present invention is not limited to the examples described below. In this regard, the amount of the component expressed in "part" or "%" is on a mass basis, unless otherwise specified. The particle diameter at a cumulative volume of 50% of the silver particles was measured by a particle size analyzer (trade name "UPA-EX150" produced by NIKKISO CO., LTD.) on the basis of a dynamic light scattering method.

Preparation of Dispersion Liquid of Metal Particles
Dispersion Liquids 1 and 3 to 6

Dispersion liquids 1 and 3 to 6 were prepared referring to the description of example 2-2 in Japanese Patent Laid-Open No. 2004-285106. Specifically, silver nanocolloids (80° C.) were prepared by adding sodium citrate (reducing agent) to an aqueous solution containing silver nitrate and a dispersant so as to reduce silver ions. At this time, a mixture of sodium dodecanesulfonate serving as an anionic surfactant and octaethylene glycol mono-n-dodecyl ether serving as a nonionic surfactant (molar ratio of 4.0:0.1) was used as the dispersant. The contents of silver particles and dispersant were adjusted to values shown in Table 1 by appropriately changing the molar ratios of silver nitrate and dispersant. Thereafter, the particle diameter at a cumulative volume of 50% of the silver particles was adjusted to about 20 nm by performing cooling to 15° C. so as to prepare dispersion liquids 1 and 3 to 6. The oxidation-reduction potential of sodium citrate measured under the same condition as that described later was 216 mV.

Dispersion Liquid 2

Dispersion liquid 2 was prepared referring to the description of example 2 in PCT Japanese Translation Patent Publication No. 2010-507727. Specifically, silver oxide nanosol was prepared by adding a mixture of sodium hydroxide aqueous solution and an aqueous solution of an acrylic resin (trade name "Disperbyk190" produced by BYK-Chemie) to a silver nitrate aqueous solution under stirring. At this time, the amount of acrylic resin aqueous solution used was adjusted such that the contents of silver particles and dispersant were set to be values shown in Table 1. A formaldehyde aqueous solution (reducing agent) was added thereto such that the molar ratio of silver ions to the reducing agent was set to be 1.0:10.0 and, thereafter, heating at 60° C. for 30 minutes and cooling were performed. Subsequently, unnecessary materials were removed by ultrafiltration, and the concentration of solid contents were adjusted so as to prepare dispersion liquid 2 in which the particle diameter at a cumulative volume of 50% of the silver particles was about 80 nm.

TABLE 1

Table 1: Compositions and characteristics of Dispersion liquid 1 to 6

| Dispersion liquid | Metal | | Dispersant | |
|---|---|---|---|---|
| | Type | Content (%) | Type | Content (%) |
| 1 | silver | 20.0 | anionic surfactant, nonionic surfactant | 6.0 |
| 2 | silver | 20.0 | acrylic resin | 6.0 |
| 3 | silver | 20.0 | anionic surfactant, nonionic surfactant | 2.7 |
| 4 | silver | 20.0 | anionic surfactant, nonionic surfactant | 4.0 |
| 5 | silver | 20.0 | anionic surfactant, nonionic surfactant | 30.0 |
| 6 | silver | 20.0 | anionic surfactant, nonionic surfactant | 32.7 |

Dispersion Liquid 7

Dispersion liquid 7 was obtained by preparing water-resistant aluminum pigment dispersion liquid A and performing concentration such that the content of aluminum particles was set to be 20.0% in conformity with the description of example 1 in Japanese Patent Laid-Open No. 2013-064053. Dispersion liquid 7 contained aluminum particles dispersed in an aqueous liquid medium by an acrylic resin that had a unit derived from maleic acid.

Oxidation-Reduction Potential

The oxidation-reduction potential (mV) of components used for preparing the ink was measured by using a pH meter (trade name "Portable pH meter D-74" produced by HORIBA, Ltd.) under the condition of 25° C. and pH 9. The measurements were conducted using ORP electrode (trade name "waterproof platinum combination type ORP electrode 9300-10D" produced by HORIBA, Ltd.) in which 3.33 mol/L potassium chloride aqueous solution was used as an internal liquid. A platinum electrode as a reference electrode and a silver-silver chloride electrode as a comparison electrode are integrally formed on this ORP electrode. A measurement target substance was dissolved into a borate standard solution (pH standard solution) such that the content became 0.1% by mass, the pH of the liquid was adjusted to 9, as the situation demands, and the oxidation-reduction potential was measured. A potassium hydroxide aqueous solution or sulfuric acid was used for adjusting the pH. The oxidation-reduction potentials measured are shown in Table 2.

TABLE 2

Table 2: Oxidation-reduction potential

| Compound | Oxidation-reduction potential (mV) |
|---|---|
| Sodium ascorbate | −85 |
| Ascorbic acid | −139 |
| Metol | −88 |
| Hydroquinone | −92 |
| Phenidone | −178 |
| Triethanolamine | 107 |
| Triethylamine | 197 |
| Diethanolamine | 132 |
| Diethylamine | 92 |
| Sorbitol | 139 |
| 1,2-Propanediol | 125 |
| 1,2-Pentanediol | 210 |
| 1,2-Hexanediol | 130 |
| 1,2,6-Hexanetriol | 214 |
| Glycerin | 129 |
| Trimethylolpropane | 213 |
| Ethylene glycol | 171 |
| 1,6-Hexanediol | 215 |
| Triethylene glycol | 141 |

TABLE 2-continued

Table 2: Oxidation-reduction potential

| Compound | Oxidation-reduction potential (mV) |
|---|---|
| 4-Methoxyphenol | 92 |
| Sodium sulfite | 15 |

Preparation of Ink

Examples 1 to 35 and Comparative Examples 1 to 10

The components shown in the upper sections of Tables 3 to 5 were mixed and sufficiently stirred and, thereafter, the pH of each ink was adjusted to 8 by using 1 mol/L potassium hydroxide aqueous solution (content is included in expressed content of ion-exchanged water). The pH of the ink was measured by using a pH meter (trade name "Portable pH meter D-74" produced by HORIBA, Ltd.). Subsequently, pressure filtration was performed by a filter with a pore size of 1.2 μm so as to prepare each ink of examples 1 to 35 and comparative examples 1 to 10. The characteristics of the inks are shown in the lower sections of Tables 3 to 5.

Details and the HLB values calculated by the Griffin method of various nonionic surfactants indicated by trade names in Tables 3 to 5 are as described below.

OLFINE E1010 (Nissin Chemical Industry Co., Ltd.): acetylene glycol ethylene oxide adduct, HLB value of 13

NIKKOL BL-9EX (produced by Nikko Chemicals Co., Ltd.): polyoxyethylene lauryl ether, HLB value of 14

Acetylenol E100 (produced by Kawaken Fine Chemicals Co., Ltd.): acetylene glycol ethylene oxide adduct, HLB value of 13

TABLE 3

Table 3: Composition and characteristics of ink

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Type of dispersion liquid | 1 | 2 | 1 | 1 | 1 | 1 | 1 | 1 | 1 | 1 | 1 | 1 | 1 | 1 | 1 |
| Dispersion liquid | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |
| Sodium ascorbate | 1.5 | 1.5 | 1.5 | 1.5 | 1.5 | 1.0 | | | | | 1.5 | 1.5 | 1.5 | 1.5 | 1.5 |
| Ascorbic acid | | | | | | | 1.5 | | | | | | | | |
| Metol | | | | | | | | 1.5 | | | | | | | |
| Hydroquinone | | | | | | | | | 1.5 | | | | | | |
| Phenidone | | | | | | 0.5 | | | | 0.5 | | | | | |
| Triethanolamine | 1.0 | 1.0 | 1.0 | 1.0 | 1.0 | 1.0 | 1.0 | 1.0 | 1.0 | 1.0 | | | | | |
| Triethylamine | | | | | | | | | | | | 1.0 | | | |
| Diethanolamine | | | | | | | | | | | | | | | |
| Diethylamine | | | | | | | | | | | | | | | |
| Sorbitol | | | | | | | | | | | | | 7.0 | | |
| 1,2-Propanediol | | | | | | | | | | | | | | 7.0 | |
| 1,2-Pentanediol | | | | | | | | | | | | | | | 7.0 |
| 1,2-Hexanediol | | | | | | | | | | | | | | | |
| 1,2,6-Hexanetriol | | | | | | | | | | | | | | | |
| Glycerin | | | | | | | | | | | | | | | |
| Trimethylolpropane | | | | | | | | | | | | | | | |
| Ethylene glycol | | | | | | | | | | | | | | | |
| 1,6-Hexanediol | | | | | | | | | | | | | | | |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| 4-Methoxyphenol | | | | 1.0 | | | | | | | | | | | |
| Sodium sulfite | | | | | 1.0 | 1.0 | | | | | | | | | |
| Acetylenol E100 | 0.2 | 0.2 | | 0.2 | 0.2 | 0.2 | 0.2 | 0.2 | 0.2 | 0.2 | 0.2 | 0.2 | 0.2 | 0.2 | 0.2 |
| NIKKOL BL-9EX | | | 0.2 | | | | | | | | | | | | |
| OLFINE E1010 | | | | | | | | | | | | | | | |
| Ion-exchanged water | 72.3 | 72.3 | 72.3 | 71.3 | 71.3 | 71.3 | 72.3 | 72.3 | 72.3 | 73.3 | 72.3 | 66.3 | 66.3 | 66.3 | 66.3 |
| Silver particle content P (%) | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Dispersant content D (%) | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| D/P value (time) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Silver particle content S (mmol/g) | 27.8 | 27.8 | 27.8 | 27.8 | 27.8 | 27.8 | 27.8 | 27.8 | 27.8 | 27.8 | 27.8 | 27.8 | 27.8 | 27.8 | 27.8 |
| First reducing agent content $R_1$ (mmol/g) | 7.6 | 7.6 | 7.6 | 7.6 | 7.6 | 8.1 | 8.5 | 6.8 | 13.6 | 3.1 | 7.6 | 7.6 | 7.6 | 7.6 | 7.6 |
| Second reducing agent content $R_2$ (mmol/g) | 6.7 | 6.7 | 6.7 | 6.7 | 6.7 | 6.7 | 6.7 | 6.7 | 6.7 | 6.7 | 9.9 | 38.4 | 92.0 | 67.2 | 59.2 |
| $R_1/S$ value (time) | 0.3 | 0.3 | 0.3 | 0.3 | 0.3 | 0.3 | 0.3 | 0.2 | 0.5 | 0.1 | 0.3 | 0.3 | 0.3 | 0.3 | 0.3 |
| $R_2/R_1$ value (time) | 0.9 | 0.9 | 0.9 | 0.9 | 0.9 | 0.8 | 0.8 | 1.0 | 0.5 | 2.2 | 1.3 | 5.1 | 12.1 | 8.8 | 7.8 |

TABLE 4

Table 4: Composition and characteristics of ink

| | Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Type of dispersion liquid | 1 | 1 | 1 | 1 | 1 | 1 | 1 | 1 | 1 | 1 | 1 | 1 | 1 | 1 | 1 |
| Dispersion liquid | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |

TABLE 4-continued

Table 4: Composition and characteristics of ink

| | Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Sodium ascorbate | 1.5 | 1.5 | 1.5 | 1.5 | 1.5 | 1.5 | 1.5 | 0.2 | 0.6 | 5.0 | 5.0 | 5.0 | 0.5 | 2.0 | 1.0 |
| Ascorbic acid | | | | | | | | | | | | | | | |
| Metol | | | | | | | | | | | | | | | |
| Hydroquinone | | | | | | | | | | | | | | | |
| Phenidone | | | | | | | | | | | | | | | |
| Triethanolamine | | | | | | 1.0 | 1.0 | 1.0 | 1.0 | 1.0 | 0.1 | 0.4 | 3.7 | | |
| Triethylamine | | | | | | | | | | | | | | | |
| Diethanolamine | | | | | | | | | | | | | | | |
| Diethylamine | | | | | | | | | | | | | | | |
| Sorbitol | | | 7.0 | | | | 7.0 | | | | | | | | |
| 1,2-Propanediol | | | | 7.0 | 7.0 | 7.0 | | | | | | | | 0.5 | 1.0 |
| 1,2-Pentanediol | | | | | | | | | | | | | | | |
| 1,2-Hexanediol | | | | | | | | | | | | | | | |
| 1,2,6-Hexanetriol | 7.0 | | | | | | | | | | | | | | |
| Glycerin | | 7.0 | | | | | | | | | | | | | |
| Trimethylolpropane | | | 7.0 | | | | | | | | | | | | |
| Ethylene glycol | | | | | | | | | | | | | | | |
| 1,6-Hexanediol | | | | | | | | | | | | | | | |
| Triethylene glycol | 10.0 | 10.0 | 10.0 | | 10.0 | 10.0 | 10.0 | 10.0 | 10.0 | 10.0 | 10.0 | 10.0 | 10.0 | 10.0 | 10.0 |
| 4-Methoxyphenol | | | | | | | | | | | | | | | |
| Sodium sulfite | | | | | | | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| NIKKOL BL-9EX | | | | | | | | | | | | | | | |
| OLFINE E1010 | | | | | | | | | | | | | | | |
| Ion-exchanged water | 66.3 | 66.3 | 66.3 | 76.3 | 76.3 | 65.3 | 58.3 | 73.6 | 73.2 | 68.8 | 69.7 | 69.4 | 70.6 | 72.3 | 72.8 |
| Silver particle content P (%) | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Dispersant content D (%) | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| D/P value (time) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Silver particle content S (mmol/g) | 27.8 | 27.8 | 27.8 | 27.8 | 27.8 | 27.8 | 27.8 | 27.8 | 27.8 | 27.8 | 27.8 | 27.8 | 27.8 | 27.8 | 27.8 |
| First reducing agent content $R_1$ (mmol/g) | 7.6 | 7.6 | 7.6 | 7.6 | 7.6 | 7.6 | 7.6 | 1.0 | 3.0 | 25.2 | 25.2 | 25.2 | 2.5 | 10.1 | 5.0 |
| Second reducing agent content $R_2$ (mmol/g) | 52.2 | 76.0 | 52.2 | 38.4 | 92.0 | 98.7 | 137.1 | 6.7 | 6.7 | 6.7 | 0.7 | 2.7 | 24.8 | 6.6 | 13.1 |
| $R_1/S$ value (time) | 0.3 | 0.3 | 0.3 | 0.3 | 0.3 | 0.3 | 0.3 | 0.04 | 0.1 | 0.9 | 0.9 | 0.9 | 0.1 | 0.4 | 0.2 |
| $R_2/R_1$ value (time) | 6.9 | 10.0 | 6.9 | 5.1 | 12.1 | 13.0 | 18.0 | 6.7 | 2.2 | 0.3 | 0.03 | 0.1 | 9.9 | 0.7 | 2.6 |

TABLE 5

Table 5: Composition and characteristics of ink

| | Example | | | | | Comparative example | | | | | | | | | |
|---|---|---|---|---|---|---|---|---|---|---|---|---|---|---|---|
| | 31 | 32 | 33 | 34 | 35 | 1 | 2 | 3 | 4 | 5 | 6 | 7 | 8 | 9 | 10 |
| Type of dispersion liquid | 3 | 4 | 5 | 6 | 3 | 7 | 1 | 1 | 1 | 1 | 1 | 1 | 1 | 7 | 1 |
| Dispersion liquid | 15.0 | 15.0 | 15.0 | 15.0 | 15.0 | 15.0 | 15.0 | 15.0 | 15.0 | 15.0 | 15.0 | 15.0 | 15.0 | 5.0 | 50.0 |
| Sodium ascorbate | 1.5 | 1.5 | 1.5 | 1.5 | | 1.5 | | | 1.5 | 1.5 | 1.5 | 1.5 | 1.5 | | |
| Ascorbic acid | | | | | | | | | | | | | | | |
| Metol | | | | | | | | | | | | | | | |
| Hydroquinone | | | | | 0.2 | | | | | | | | | | |
| Phenidone | | | | | | | | | | | | | | | |
| Triethanolamine | 1.0 | 1.0 | 1.0 | 1.0 | | 1.0 | 1.0 | 1.0 | | | | | | 1.0 | 0.4 |
| Triethylamine | | | | | | | | | | | | | | | |
| Diethanolamine | | | | | | | | | | 1.0 | | | | | |
| Diethylamine | | | | | | | | | | | | 1.0 | | | |
| Sorbitol | | | | | | | | | | | | | | | |
| 1,2-Propanediol | | | | 0.1 | | | | | | | | | | | |
| 1,2-Pentanediol | | | | | | | | | | | | | | | |
| 1,2-Hexanediol | | | | | | | | | | | | | | | 1.0 | 3.0 |
| 1,2,6-Hexanetriol | | | | | | | | | | | | | | | |
| Glycerin | | | | | | | | | | | | | | 10.0 | 10.0 |
| Trimethylolpropane | | | | | | | | | | | | | | 5.0 | |
| Ethylene glycol | | | | | | | | | | | | | 7.0 | | |
| 1,6-Hexanediol | | | | | | | | | | | | | 7.0 | | |
| Triethylene glycol | 10.0 | 10.0 | 10.0 | 10.0 | 10.0 | 10.0 | 10.0 | 10.0 | 10.0 | 10.0 | 10.0 | 10.0 | 10.0 | | |
| 4-Methoxyphenol | | | | | | | | | | | | | | | |
| Sodium sulfite | | | | | | | 1.0 | | | | | | | | |

TABLE 5-continued

Table 5: Composition and characteristics of ink

|  | Example | | | | | Comparative example | | | | | | | | | |
| --- | --- | --- | --- | --- | --- | --- | --- | --- | --- | --- | --- | --- | --- | --- | --- |
|  | 31 | 32 | 33 | 34 | 35 | 1 | 2 | 3 | 4 | 5 | 6 | 7 | 8 | 9 | 10 |
| Acetylenol E100 | 0.2 | 0.2 | 0.2 | 0.2 | 0.2 | 0.2 | 0.2 | 0.2 | 0.2 | 0.2 | 0.2 | 0.2 | 0.2 | | |
| NIKKOL BL-9EX | | | | | | | | | | | | | | | |
| OLFINE E1010 | | | | | | | | | | | | | | 1.0 | 0.5 |
| Ion-exchanged water | 72.3 | 72.3 | 72.3 | 72.3 | 74.5 | 72.3 | 73.8 | 72.8 | 73.3 | 72.3 | 72.3 | 66.3 | 66.3 | 77.0 | 36.1 |
| Silver particle content P (%) | 3.0 | 3.0 | 3.0 | 3.0 | 3.0 | 0.0 | 3.0 | 3.0 | 3.0 | 3.0 | 3.0 | 3.0 | 3.0 | 0.0 | 10.0 |
| Dispersant content D (%) | 0.4 | 0.6 | 4.5 | 4.9 | 0.4 | — | 0.9 | 0.9 | 0.9 | 0.9 | 0.9 | 0.9 | 0.9 | — | 3.0 |
| D/P value (time) | 0.1 | 0.2 | 1.5 | 1.6 | 0.1 | — | 0.3 | 0.3 | 0.3 | 0.3 | 0.3 | 0.3 | 0.3 | — | 0.3 |
| Silver particle content S (mmol/g) | 27.8 | 27.8 | 27.8 | 27.8 | 27.8 | 0.0 | 27.8 | 27.8 | 27.8 | 27.8 | 27.8 | 27.8 | 27.8 | 0.0 | 92.7 |
| First reducing agent content $R_1$ (mmol/g) | 7.6 | 7.6 | 7.6 | 7.6 | 1.8 | 7.6 | 0.0 | 0.0 | 7.6 | 7.6 | 7.6 | 7.6 | 7.6 | 0.0 | 0.0 |
| Second reducing agent content $R_2$ (mmol/g) | 6.7 | 6.7 | 6.7 | 6.7 | 1.3 | 6.7 | 6.7 | 6.7 | 0.0 | 0.0 | 0.0 | 0.0 | 0.0 | 161.0 | 136.7 |
| $R_1/S$ value (time) | 0.3 | 0.3 | 0.3 | 0.3 | 0.1 | — | 0.0 | 0.0 | 0.3 | 0.3 | 0.3 | 0.3 | 0.3 | — | 0.0 |
| $R_2/R_1$ value (time) | 0.9 | 0.9 | 0.9 | 0.9 | 0.7 | 0.9 | — | — | 0.0 | 0.0 | 0.0 | 0.0 | 0.0 | — | — |

Comparative Example 11

The ink of comparative example 11 was prepared in conformity with the description of example 5 in Japanese Patent Laid-Open No. 2011-140635. An oily dispersion liquid was prepared by mixing 1.00 g of silver nanoparticles prepared according to the description of the above-described literature, 1.00 g of naphthenic nonaqueous solvent (trade name "AF Solvent No. 4" produced by Nippon Oil Corporation) and 0.13 g of emulsifier (trade name "Hexaglyn 5-O" produced by Nikko Chemicals Co., Ltd.). Separately from this, 1.05 g of ethylene glycol, 0.05 g of ascorbic acid and 3.38 g of ion-exchanged water were mixed and added to the total amount of the oily dispersion liquid prepared as described above, and sufficient stirring was performed so as to prepare the ink of comparative example 11. The silver particle content P in the ink was 15.1%, the emulsifier (dispersant) content D was 1.9% and the D/P value was 0.1 times. The silver particle content S in the ink was 140.0 mmol/g, the first reducing agent content $R_1$ was 4.0 mmol/g and the $R_1/S$ value was 0.03 times.

Evaluation

An ink cartridge was filled with each ink prepared as described above and set into an ink jet recording apparatus (trade name "PIXUS MG3630" produced by CANON KABUSHIKI KAISHA) including a recording head that ejected an ink by the action of thermal energy. In the present example, an image recorded under the condition in which 2 ink droplets, about 11.2 ng each, were applied to a unit region of 1/600 inch×1/600 inch was denoted as an image with a recording duty of 100%. The ink jet recording apparatus was used, and a solid image with a recording duty of 100% was recorded on a recording medium (glossy paper, trade name "CANON Photo Paper. Pro Platinum" produced by CANON KABUSHIKI KAISHA). The resulting solid image was evaluated as described below. In the present disclosure, AA, A or B in the following evaluation criteria of each item was assumed to be an acceptable level, and C was assumed to be an unacceptable level. The evaluation results are shown in Table 6.

Glossiness (Initial)

The image obtained as described above was left to stand for an hour in an environment at normal temperature and normal pressure (temperature of 25° C. and relative humidity of 50%) and, thereafter, specular glossiness of the solid image at an angle of 20° was measured by using a glossmeter (trade name "Surface Reflectance Analyzer RA-532H" produced by CANON KABUSHIKI KAISHA). Glossiness (initial) was evaluated from the resulting glossiness (hereafter referred to as "glossiness") on the basis of the evaluation criteria described below.

A: the glossiness$_1$ was 650 or more
B: the glossiness$_1$ was 350 or more to less than 650
C: the glossiness$_1$ was less than 350

Suppression of Degradation in Glossiness

The image obtained as described above was left to stand for a week in an environment at a temperature of 30° C. and relative humidity of 80% and, thereafter, specular glossiness at an angle of 20° was measured in the same manner as the case of evaluation of "glossiness (initial)". The conditions of a temperature of 30° C. and relative humidity of 80% corresponded to an accelerated test on the assumption that the image was stored for a long period. From the resulting glossiness (hereafter referred to as "glossiness$_2$") and the "glossiness$_1$" measured in advance, the value of residual ratio (%) of glossiness={(glossiness$_2$)/(glossiness$_1$)}×100 was calculated. Suppression of degradation in glossiness was evaluated from the resulting residual ratio on the basis of the evaluation criteria described below. A higher residual ratio indicates that degradation in glossiness after the image was stored was suppressed.

AA: the residual ratio was 70% or more
A: the residual ratio was 60% or more to less than 70%
B: the residual ratio was 50% or more to less than 60%
C: the residual ratio was less than 50%

TABLE 6

Table 6: Evaluation result

|  |  | Glossiness (initial) | Suppression of degradation in glossiness |
| --- | --- | --- | --- |
| Example | 1 | A | AA |
|  | 2 | A | AA |
|  | 3 | A | AA |
|  | 4 | A | AA |
|  | 5 | A | AA |
|  | 6 | A | AA |
|  | 7 | A | AA |
|  | 8 | A | A |
|  | 9 | A | A |
|  | 10 | A | A |

TABLE 6-continued

Table 6: Evaluation result

|  |  | Glossiness (initial) | Suppression of degradation in glossiness |
|---|---|---|---|
|  | 11 | A | A |
|  | 12 | A | A |
|  | 13 | A | A |
|  | 14 | A | A |
|  | 15 | A | A |
|  | 16 | A | A |
|  | 17 | A | A |
|  | 18 | A | A |
|  | 19 | A | A |
|  | 20 | A | A |
|  | 21 | A | AA |
|  | 22 | A | AA |
|  | 23 | B | A |
|  | 24 | A | AA |
|  | 25 | A | AA |
|  | 26 | A | A |
|  | 27 | A | AA |
|  | 28 | A | AA |
|  | 29 | A | A |
|  | 30 | A | A |
|  | 31 | A | A |
|  | 32 | A | AA |
|  | 33 | A | AA |
|  | 34 | B | AA |
|  | 35 | B | B |
| Comparative example | 1 | C | AA |
|  | 2 | B | C |
|  | 3 | B | C |
|  | 4 | A | C |
|  | 5 | A | C |
|  | 6 | A | C |
|  | 7 | A | C |
|  | 8 | A | C |
|  | 9 | C | AA |
|  | 10 | B | C |
|  | 11 | A | C |

According to the present disclosure, an aqueous ink with which an image having excellent glossiness not only just after recording but also after storage is recorded, an ink cartridge using the aqueous ink and an ink jet recording method are provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-077807 filed Apr. 13, 2018 and No. 2019-051934 filed Mar. 19, 2019, which are hereby incorporated by reference herein in their entirety.

What is claimed is:

1. An aqueous ink comprising:
   silver particles;
   a first reducing agent; and
   a second reducing agent,
   wherein the first reducing agent comprises a compound that has an oxidation-reduction potential $R_1$ (mV) satisfying $R_1<0$, and
   the second reducing agent is a compound that has an oxidation-reduction potential $R_2$ (mV) satisfying $R_2 \geq 0$ and that is at least one member selected from the group consisting of tertiary amines and polyhydric alcohols in which a plurality of hydroxy groups are included in one of two structures divided according to a position between any one of two adjacent carbon atoms of the longest carbon chain in the molecule.

2. The aqueous ink according to claim 1, wherein the first reducing agent is at least one member selected from the group consisting of saccharides having a lactone structure, phenols and pyrazolidones.

3. The aqueous ink according to claim 1, wherein the first reducing agent is ascorbic acid.

4. The aqueous ink according to claim 1, wherein the second reducing agent is an alkanolamine.

5. The aqueous ink according to claim 1, wherein the second reducing agent is triethanolamine.

6. The aqueous ink according to claim 1, wherein, in the aqueous ink, a molar ratio of the content (mmol/g) of the first reducing agent to the content (mmol/g) of the silver particles is 0.1 times or more.

7. The aqueous ink according to claim 1, wherein, in the aqueous ink, a molar ratio of the content (mmol/g) of the second reducing agent to the content (mmol/g) of the first reducing agent is 0.1 times or more.

8. The aqueous ink according to claim 1, wherein the aqueous ink comprises a dispersant configured to disperse the silver particles, and
   in the aqueous ink, a mass ratio of the content (% by mass) of the dispersant to the content (% by mass) of the silver particles is 0.2 times or more to 1.5 times or less.

9. An ink cartridge comprising:
   an ink; and
   an ink storage portion for storing the ink,
   wherein the ink comprises the aqueous ink according to claim 1.

10. An ink jet recording method for recording an image on a recording medium by ejecting an ink from an ink jet recording head,
    wherein the ink comprises the aqueous ink according to claim 1.

11. The ink jet recording method according to claim 10, wherein the recording medium includes an ink-receiving layer that contains a chloride ion.

* * * * *